United States Patent [19]

Wang

[11] 3,803,393

[45] Apr. 9, 1974

[54] ASYNCHRONOUS BINARY ARRAY DIVIDER

[75] Inventor: Gary Y. Wang, Wellesley Hills, Mass.

[73] Assignee: The United States of America as represented by the Administrator of the National Aeronautics and Space Administration, Washington, D.C.

[22] Filed: July 1, 1969

[21] Appl. No.: 838,278

[52] U.S. Cl. .............................................. 235/164
[51] Int. Cl. .............................................. G06f 7/54
[58] Field of Search .............................. 235/164, 156

[56] References Cited

UNITED STATES PATENTS

| | | | |
|---|---|---|---|
| 3,257,548 | 6/1966 | Fleisher et al. | 235/164 |
| 3,378,677 | 4/1968 | Waldecker et al. | 235/164 |
| 3,229,079 | 1/1966 | Zink, Jr. | 235/164 |
| 3,064,896 | 11/1962 | Carroll et al. | 235/164 |

*Primary Examiner*—Felix D. Gruber
*Assistant Examiner*—David H. Malzahn
*Attorney, Agent, or Firm*—William H. King; John R. Manning; Howard J. Osborn

[57] ABSTRACT

This disclosure describes an asynchronous binary divider formed of an array of identical logic cells. Each cell includes a single bit binary subtractor and a selection gate. The array is connected to divisor, dividend, quotient and remainder registers. Divisor and dividend numbers are read into the divisor and dividend registers, respectively. The array of identical logic cells performs the division in parallel asynchronously and places the results of the division in the quotient and remainder registers for subsequent readout.

7 Claims, 4 Drawing Figures

INVENTOR
Gary Y. Wang

BY
ATTORNEYS

INVENTOR
Gary Y. Wang

BY

ATTORNEYS

INVENTOR
Gary Y. Wang

ASYNCHRONOUS BINARY ARRAY DIVIDER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to digital computers, and more particularly to a new and improved asynchronous binary divider. Binary dividers suitable for use in computers to perform binary division are well known. Generally, prior art apparatus for performing binary division use controlled sequences of subtract-and-shift operations to perform the desired division. More specifically, the normal method of operation of prior art binary division apparatus is very straight forward and, relatively, uncomplicated. The method is much the same as the method a person with pencil and paper uses to carry out decimal division in long-hand — by a sequence of conditional subtractions and shifts. In general, this method requires that the person attempt to determine the quotient digits by examining the divisor with relation to the dividend or partial remainder. For example, in the case of two positive binary numbers, the magnitude of the divisor (S) is compared with the magnitude of the divident or partial remainder (R) to determine the proper quotient digit. If (S) $\leq$ (R), a 1 is entered for the quotient digit and (S) is subtracted from (R). In addition, the result is shifted to the left one bit position to form a new partial remainder. If (S) > (R), a zero is entered for the quotient digit and the previous partial remainder is shifted one bit position to the left to form a new partial remainder. The following example more specifically illustrates this procedure:

Let Dividend (D)=.0101 in Binary=+5/16 in Decimal
Divisor (S)=.1100 in Binary=+3/4 in Decimal

```
         1  1→1  1
          ↗    ↖
        .0       0            Quotient
      ___________
1100 | 01010
      -1100                  1st try (D)  (S) unsuccessful
       10100
       -1100                 2nd try (R)  (S) successful
        10000
        -1100                3rd try (R)  (S) successful
         01000
         -1100               4th try (R)  (S) unsuccessful
          1000               Remainder
```

The foregoing procedure can be most accurately described as an attempt to obtain a 1 for the quotient bit. If the first try is unsuccessful, the quotient bit must be a 0, since only two alternatives are available. The answers to the foregoing example are: Quotient (Q) = 0.0110=3/8; and, Remainder (R)=0.00001=1/32.

It will be appreciated from the foregoing description that the mode of operation of prior art binary dividers is repetitive subtract-and-shift operations. Because these operations are serial in nature, prior art binary dividers have a speed limitation. In addition, serial operating systems require complex control logic systems to control the required operations. And, complex control logic systems inherently have poor performance and reliability. The requirements for complex control logic systems also prevent prior art binary dividers from being formed of identical logic elements or subsystems, thereby making them difficult to construct in modular form.

Therefore, it is an object of this invention to provide a new and improved asynchronous binary divider suitable for use in a digital computer.

It is a further object of this invention to provide an asynchronous binary array divider which operates essentially simultaneously as opposed to sequentially with respect to the subtract-and-shift operations necessary to perform division thereby speeding the overall operation of the divider.

It is a still further object of this invention to provide an asynchronous binary array divider formed of an array of identical logic elements virtually eliminating all complex control logic system circuitry that is needed to control prior art binary dividers.

And still another object of this invention is to provide an asynchronous binary divider formed of an array of identical logic elements thereby reducing cost and design effort and increasing reliability.

SUMMARY OF THE INVENTION

In accordance with a principle of this invention, an asynchronous binary divider formed of an array of identical logic cells is provided. Divider, dividend, quotient and remainder registers are connected to the array. In operation, divisor and dividend numbers are read into the respective divisor and dividend registers. The array reads the number in the registers and performs the required subtract-and-shift division operations essentially simultaneously. The results of the simultaneous subtract-and-shift division operations are placed in the quotient and remainder registers for subsequent readout.

In accordance with a further principle of this invention, the logic cells of the array are each formed of a single bit binary subtractor and a selection gate. And, each single bit binary subtractor and each selection gate is formed of digital logic gates.

It will be appreciated from the foregoing summary of the invention that a binary divider that overcomes the prior art problems previously described is provided by the invention. Because the binary array divider of the invention is formed of identical logic cells, it can take advantage of well known Large Scale Integration (LSI) techniques. Once the dividend and divisor registers are loaded, the array cells begin to work in parallel, asynchronously without the need for any timing control sequencing. After a small time delay i.e. the sum of circuit delays, both the quotient and the remainder are available to be loaded into quotient and remainder registers. Since the control circuitry necessary for controlling the division operations is simplified, performance and reliability are improved. In addition, because the array operates essentially simultaneously as opposed to sequentially, division speed is improved. Moreover, the repetitive pattern of the array allows modular expansion to suit essentially any size of operands.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figures 1, 1A:
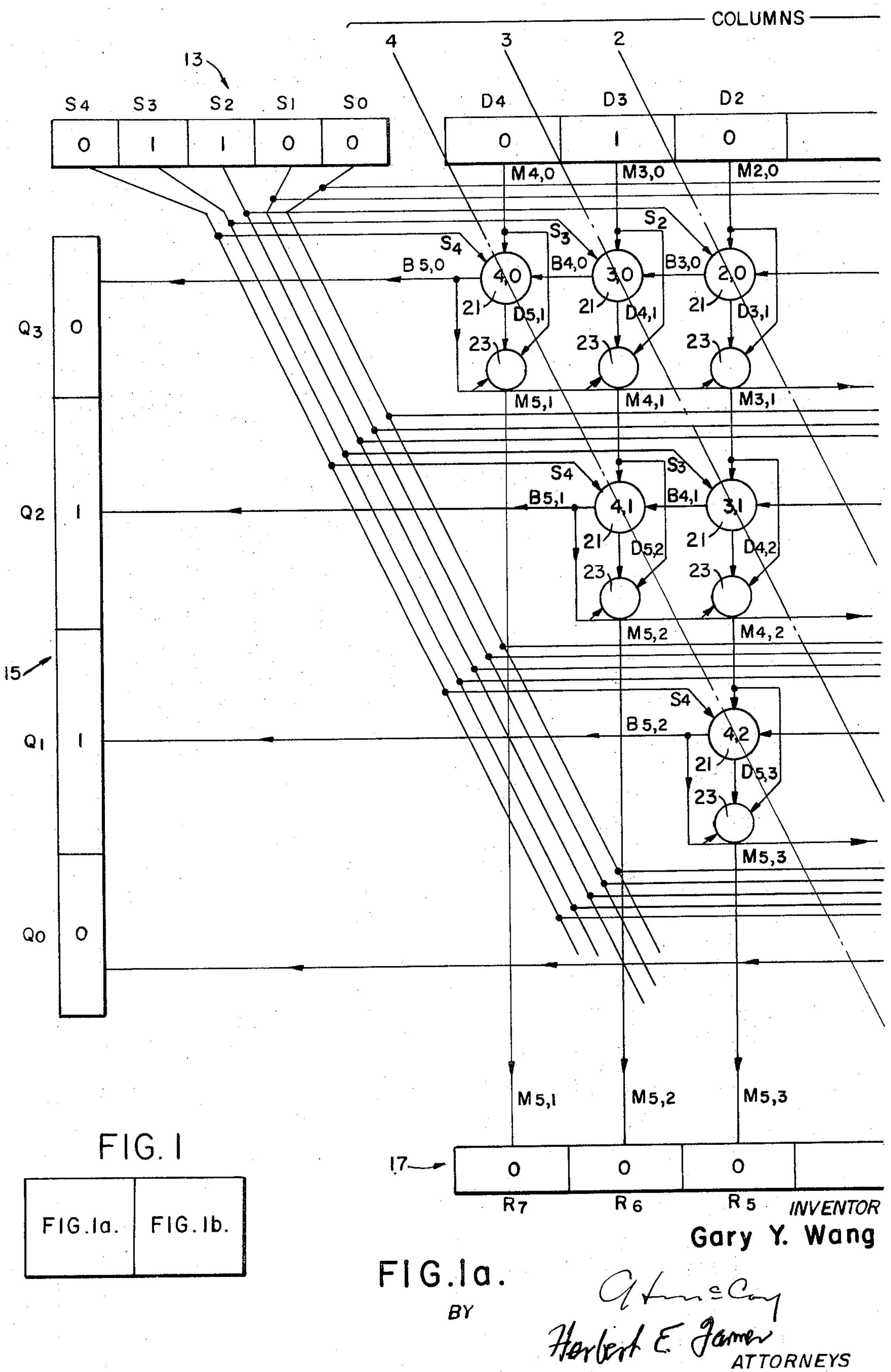
FIGS. 1*a* and 1*b* are together as illustrated by FIG. 1, a block diagram illustrating one embodiment of the invention.
Figure 1B:
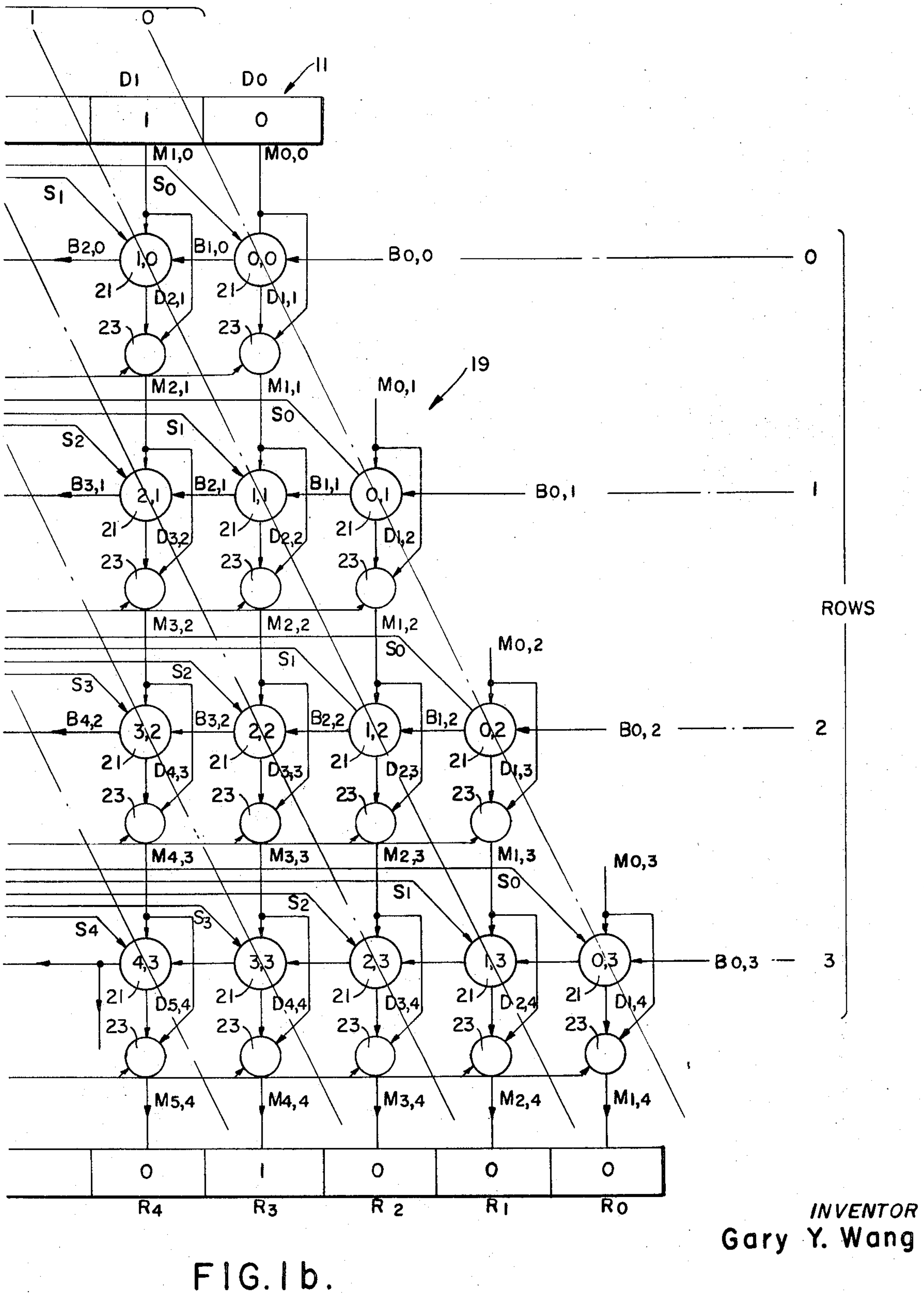

For clarity and ease of description, FIGS. 1*a* and 1*b* illustrate a 5 column × 4 row binary array divider made in accordance with the invention. However, it is to be understood that, within practical limitations, an asynchronous binary array divider formed in accordance with the invention can be made in any size.

The embodiment of the invention illustrated in FIGS. 1*a* and 1*b* includes: an N stage dividend register 11; an N stage divisor register 13; an (N−1) stage quotient register 15; and, a 2(N−1) remainder register 17. For the particular configuration illustrated, the dividend register 11 is a five stage register with the stages designated $D_0$, $D_1$, $D_2$, $D_3$ and $D_4$, with the $D_0$ stage being the lowest order stage. The divisor register 13 is also a five stage register with the stages designated $S_0$, $S_1$, $S_2$, $S_3$ and $S_4$, with the $S_0$ stage being the lowest order stage. The quotient register 15 is a four stage register with the stages designated $Q_0$, $Q_1$, $Q_2$ and $Q_3$, with the lowest order stage being $Q_0$. And, the remainder register 17 is an eight stage register with the stages designated $R_0$, $R_1$, $R_2$, $R_3$, $R_4$, $R_5$, $R_6$ and $R_7$, with stage $R_0$ being the lowest order stage.

Figure 2:
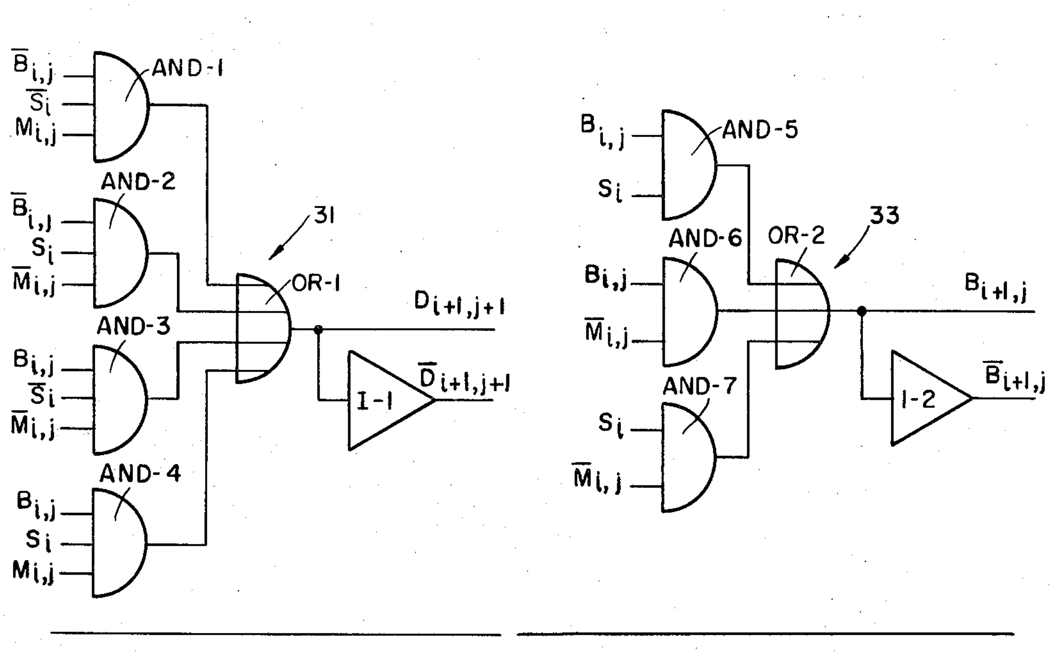
FIG. 2 is a block diagram of a single bit binary subtractor suitable for use in the embodiment of the invention illustrated in FIGS. 1*a* and 1*b*; and, FIG. 3 is a block diagram of a selection gate suitable for use in the embodiment of the invention illustrated in FIG. 1.
Figure 3:
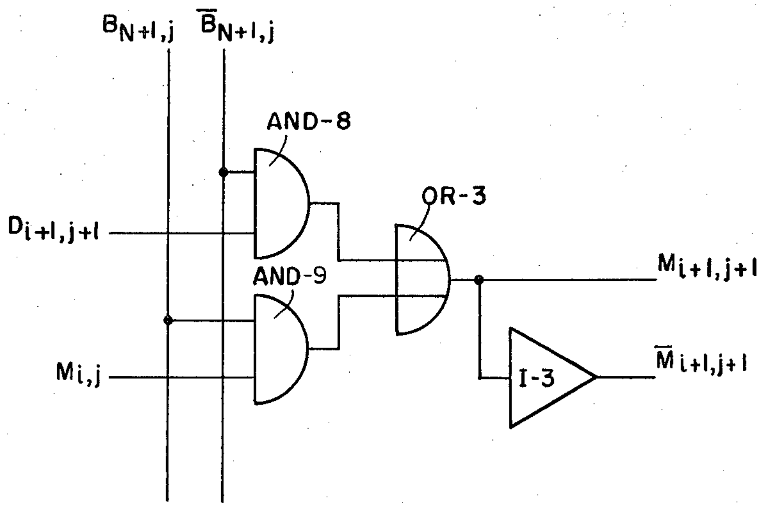

The embodiment of the invention illustrated in FIGS. 1*a* and 1*b* also includes an array 19 of N(N−1) identical logic cells, which can be denominated as $Ci$, $j_1$, where $i$ runs the gamut of integers from 0 to N−1 and $j$ runs the gamut of integers from 0 to N−2. In the illustrated embodiment the array 19 is in the form of a matrix having four rows and five columns read from top to bottom and right to left, respectively, for purposes of this description. That is, the following description uses $i$ and $j$ subscript terminology and a (+1) added to a subscript means the next lower row or the next left column, as the case may be. Each logic cell of the array comprises a single bit binary subtractor 21 and a selection gate 23. A preferred embodiment of a single bit binary subtractor is illustrated in FIG. 2 and hereinafter described. In addition, a preferred embodiment of a selection gate is illustrated in FIG. 3 and hereinafter described.

Each single bit binary subtractor 21 includes three inputs: one input is a minuend input (M) and is derived either from the dividend register 11 or from a selection gate of a higher AND-4; one logic cell. The higher order selection gate 23 is one column to the right and one row up as viewed in FIGS. 1*a* and 1*b*. The second input is a subtrahend input (S) and is derived from one of the stages of the divisor register 13. The lowest order stage ($S_0$) of the divisor register is connected to the subtractors of the first, or rightmost, column of each row; the next higher order stage ($S_1$) is connected to the next leftmost column of each row; etc. The third input to each single bit binary subtractor 21 is the borrow input (B) and is derived from the single bit binary subtractor of the next lower order column in the same row. It should be noted that in accordance with conventional digital logic diagrams, the borrow input is illustrated as an arrow away from a particular subtractor, the arrow indicating where the borrow comes from, not where it goes.

The uppermost and rightmost (0,0 as illustrated in FIGS. 1*a* and 1*b* single bit binary subtractor 21 receives its minuend input from the $D_0$ stage of the dividend register 11 and its subtrahend input from the $S_0$ stage of the divisor register 13. The next leftmost (1,0) subtractor in the same row receives its minuend input from the $D_1$ stage of the dividend register 11 and its subtrahend input from the $S_1$ stage of the divisor register 13. This input arrangement continues until the leftmost subtractor of the first row receives its minuend input from the $D_4$ stage of the dividend register 11 and its subtrahend input from the $S_4$ stage of the divisor register 13.

The rightmost subtractor (0,1) of the next row receives its minuend input from the output of the selection gate 23 of the logic cell in a row not shown. In this example, as shown in FIG. 1, the rightmost logic cells in rows 1, 2, and 3 are subject to boundary constraints, i.e. all borrows and minuends inputs are logical 0's. In addition the borrow input of the rightmost logic cell in the first row is a logical 0. This same subtractor (0,1) receives its subtrahend input from the $S_0$ stage of the divisor register 13. The second subtractor in the second row receives its minuend input from the output of the selection gate of the logic cell in the first row, first column; and, its subtrahend input from the output of the $S_1$ stage of the divisor register 13. In a similar manner, the subtractors 21 of the remaining rows are connected to the selection gates of preceeding rows and the stages of the divisor register.

Each single bit binary subtractor has two outputs, one output is the borrow output (B) for the next higher order subtractor. The borrow output of the leftmost subtractor of a particular row is the quotient for that row and is connected to the input of one of the stages of the quotient register 18. The borrow output of the leftmost subtractor 21 of a particular row is also connected to each selector gate of that row as illustrated in FIG. 3 and hereinafter described. The other output of each single bit binary subtractor is a difference output (D) and is connected to one input of the selector gate of the same logic cell of the array.

Each selection gate 23 has three inputs and one output. As previously described, first and second of the inputs are respectively derived from the input and output of the subtractor 21 forming a part of the same logic cell. The third input is derived from the borrow output of the leftmost borrow network of the same row, whereby for example, each of the selection networks having one input responsive to $D_{1,1}$. . . $D_{5,1}$difference signals is responsive to the $B_{5,0}$ borrow signals. The outputs of the selection gates deriving outputs $M_{N,j3}$ where $j3$ runs the gamut from 1 to N−1, (i.e., $M_{5,1}$, $M_{5,2}$, $M_{5,3}$, and $M_{5,4}$) and $M_{i,N-1}$ where $i$ runs the gamut from 1 to N−1, (i.e., $M_{1,4}$, $M_{2,4}$, $M_{3,4}$ and $M_{4,4}$) are connected to different stages of the remainder register 17, the $M_{5,1}$ signal being coupled to $R_7$, the $M_{5,2}$ signal being coupled to $R_6$, etc. The outputs of the other selection gates 23 are connected to the next left and next lower subtractor to form the minuend input for that subtractor, as previously described.

FIG. 2 illustrates a single bit binary subtractor made in accordance with the invention and comprises a difference part 31 and a borrow part 33. The difference part comprises four AND gates designated AND-1, AND-2, AND-3, and AND-4; one OR gate designated OR-1; and, one inverter gate designated I-1. Each AND gate is a three input AND gate and the OR gate is a four input OR gate.

For ease of description, *i* and *j* subscripts are used in FIGS. 2 and 3 and the following description, where *i* is a column index subscript and *j* is a row index subscript and the addition of a +1 to a particular *i* or *j* means that the particular output goes to an input in the next column or row, as the case may be. The B inputs to the AND gates illustrated in FIG. 2 are borrow inputs from lower order logic elements as illustrated in FIG. 1 and previously described. The M inputs are minuend inputs either from the dividend register 11 in the case of the first row of logic cells or higher order selector subsections 23, for all of the subsequent rows also as illustrated in FIG. 1 and previously described.

AND-1 has a $\overline{B}_{i,j}$ input, an $\overline{S}_i$ input and an $M_{i,j}$ input; AND-2 has a $\overline{B}_{i,j}$ input, an $S_i$ input and an $\overline{M}_{i,j}$ input; AND-3 has a $B_{i,j}$ input, an $\overline{S}_i$ input, and an $\overline{M}_{i,j}$ input; and AND-4 has a $B_{i,j}$ input, an $S_i$ input, and an $M_{i,j}$ input. The outputs of AND-1, AND-2, AND-3, and AND-4 are separately connected to the four inputs of OR-1. The output of OR-1 is a difference output, is designated $D_{i+1,j+1}$ and is connected to a selector subsection of the type illustrated in FIG. 3 and hereinafter described. In addition, the output of OR-1 is connected through I-1 so as to form a $\overline{D}_{i+1,j+1}$ output.

The borrow part 33 of the subtractor illustrated in FIG. 2 comprises; three AND gates designated AND-5, AND-6, and AND-7; an OR gate designated OR-2; and, an inverter designated 1-2. The AND gates are two input AND gates, and the OR gate is a three input OR gate. AND-5 has a $B_{i,j}$ and an $S_i$ input; AND-6 has a $B_{i,j}$ and an $\overline{M}_{i,j}$ input; and, AND-7 has an $S_i$ and a $\overline{M}_{i,j}$ input. The outputs of AND-5, AND-6 and AND-7 are separately connected to the three inputs of OR-2. The output of OR-2 is a $B_{i+1,j}$ output and is connected to the next higher order subtractor as the $B_{i,j}$ input. In addition, the output from OR-2 is connected through I-2 so as to form a $\overline{B}_{i+1,j}$ output which forms the $B_{i,j}$ input for the next higher order subtractor.

The following is a truth table for the single bit binary subtractor illustrated in FIG. 2:

| Borrow in ($B_{i,j}$) | Subtrahend ($S_i$) | Minued ($M_{i,j}$) | Difference ($D_{i+1,j+1}$) | Borrow out ($B_{i+1,j}$) |
|---|---|---|---|---|
| 0 | 0 | 0 | 0 | 0 |
| 0 | 0 | 1 | 1 | 0 |
| 0 | 1 | 0 | 1 | 1 |
| 0 | 1 | 1 | 0 | 0 |
| 1 | 0 | 0 | 1 | 1 |
| 1 | 0 | 1 | 0 | 0 |
| 1 | 1 | 0 | 0 | 1 |
| 1 | 1 | 1 | 1 | 1 |

$D_{i+j,i+1}=\overline{B}_{i,j}\overline{S}_iM_{i,j}+\overline{B}_{i,j}S_i\overline{M}_{i,j}+B_{i,j}\overline{S}_i\overline{M}_{i,j}+B_{i,j}S_iM_{i,j}$ $B_{i+1,j}=B_{i,j}S_i+B_{i,j}\overline{M}_{i,j}+S_i\overline{M}_{i,j}$ FIG. 3 illustrates a preferred embodiment of a selection gate and comprises: two AND gates designated

AND-8 and AND-9; one OR gate designated OR-3; and, one inverter designated I-3. The AND gates are two input AND gates and the OR gate is a two input OR gate. For purposes of this description, the borrow outputs of the leftmost subtractors which, as illustrated in FIG. 1, are connected to the quotient register 15 and also to the selection gates are designated $B_{n+1,j}$ and $\overline{B}_{n+1,j}$. AND-8 has $\overline{B}_{n+1,j}$ and $D_{i+1,i+1}$ inputs; and AND-9 has $B_{n+1,j}$ and $M_{i,j}$ inputs. The outputs of AND-8 and AND-9 are connected to the inputs OR-3. The output of OR-3, designated $M_{i+1,j+1}$ can therefore be written as $D_{i+1,j}\ \overline{B_{n+1,j}} + B_{n+i,j}\ M_{i,j}$ and is connected as the $M_{i,j}$ input to the subtractor of the next row and column as illustrated in FIGS. 1*a* and 1*b*. In addition, the output from OR-3 is applied through I-3 to create an $\overline{M}_{i+1,j+1}$ output. This latter output is connected as the $\overline{M}_{i,j}$ input to the next appropriate row and column subtractor subsection. The various stages of the quotient register 15 are set to logical 1's by the negation (i.e. $\overline{B}_{n+1,j}$) of the leftmost borrows of the corresponding rows.

Turning now to a description of the operation of the embodiment of the invention illustrated in the figures, as will be appreciated from viewing FIGS. 1*a* and 1*b*, all of the selection gates in a particular row are commonly controlled by the quotient bit or borrow circuit of the last subractor in that row. If $B_{n+1,j}$ for that row is a binary zero (0), the results of the subtractors in that row are fed through the selection gates and used as the partial remainder for the next row. However, when a borrow occurs (i.e., $B_{n+1,j}$ is a binary one (1) at the last subtractor of a particular row, the results of the subtractors in that row are by-passed and the partial remainder of the previous row is used as the partial remainder for the next row. The displacement of one column bit position between rows, corresponding to one bit left shift of the partial remainder, is accomplished automatically due to the arrangement of the array.

For illustrative purposes, the example discussed in the introduction to this disclosure is illustrated in FIGS. 1*a* and 16. Specifically, a binary dividend of 0.0101 (5/16 in decimal) is read into the dividend register 11 by any suitable, well known, control means. Similarly, a binary divisor of 0.1100 (3/4 in decimal) is read into the divisor register 13 by any suitable means. In addition, the following set of boundary conditions is set up for the edges of the array;

| | |
|---|---|
| $B_{0,0} = 0$ | $M_{4,0} = 0$ |
| $B_{0,1} = 0$ | $M_{0,1} = 0$ |
| $B_{0,2} = 0$ | $M_{0,2} = 0$ |
| $B_{0,3} = 0$ | $M_{0,3} = 0$ |

Moreover, the quotient and remainder registers are cleared. Thereafter, the subtractors of the first row (0) operate essentially simultaneously from right to left to form the quotient for the first row which is the borrow ($\overline{B}_{5,0}$) that controls the selector gates of the first row as previously described. Thereafter, the second row (1) subtractors operate from right to left essentially simultaneously to form the second quotient bit which is the borrow ($\overline{B}_{5,1}$) that controls the selection gates of the second row. This action continues through the third (2) and fourth (3) rows. The end result of these operations is the formation of the binary number 0.0110 (⅜ in decimal) in the quotient register and the formation of the binary number 0.00001000 (1/32 in decimal) in the remainder register.

It will be appreciated from the foregoing description that the subtract-and-shift operations described in the discussion of this example in the introduction to the disclosure are all carried out by the binary array. However, these operations are carried out essentially simultaneously as opposed to serially. Hence, the asynchronous binary array divider of the invention is considerably more rapid in operation than prior art binary dividers wherein subtract-and-shift operations are carried out serially. More specifically, it will be appreciated by those skilled in the art and others that the foregoing sequence of operations is essentially simultaneous as opposed to serially. Contrawise, prior art systems generally perform the required subtract-and-shift operations in series, thereby performing the overall division operation relatively slowly. Hence, this invention considerably speeds up the overall division operation.

It will also be appreciated by those skilled in the art that the invention has other advantages over prior art binary dividers. For example, because the invention utilizes an array of identical logic cells it can be created in modular form and easily expanded, if necessary. Also many different types of logic cells may be used. In addition, the control circuitry necessary for the operation of the invention is greatly reduced over prior art dividers, hence, the cost of manufacturing a divider to carry out a particular size of division operations is greatly reduced. Moreover, due to the reduction in the number of control components, the reliability of the overall system is improved.

What is claimed is:

1. An asynchronous binary array divider comprising a dividend register having N binary stages each storing a binary minuend signal denominated as $M_{i,0}$, where $i$ runs the gamut of integers from 0 to N−1, a divisor register having N binary stages, each storing a binary signal denominated as $S_j$, where $j$ runs the gamut of integers from 0 to N−1, a matrix having N(N−1) cells, each of said cells being denominated as $C_{i,j1}$, where $i$ runs the gamut of integers from 0 to N−1; and $j1$ runs the gamut of integers from 0 to N−2, each of said cells including a difference network for deriving a single bit binary difference signal denominated as $D_{i+1,jl+1}$ for cell $C_{i,j1}$, a borrow network for deriving a single bit binary signal denominated as $B_{i+1,jl}$ for cell $C_{i,j1}$ and indicative of whether a borrow condition exists in response to the subtraction operation performed by the difference network of cell $C_{N,j1}$, and a selection network for deriving a single bit minuend binary signal denominated as $M_{i+1,jl+1}$ for cell $C_{i,j1}$; said difference network for cell $C_{i,j1}$ being responsive to the borrow signal $B_{i,j1}$, the divisor register signal $S_j$ and the minuend signal $M_{i,jl}$, said borrow network for cell $C_{i,j1}$ being responsive to the divisor signal $S_j$ the minuend signal $M_{i,j1}$ and the borrow signal $B_{i,j1}$; and the selection network for cell $C_{i,j1}$ being responsive to the minuend signal $M_{i,jl}$ the difference signal $D_{i+1,j1+1}$ and the borrow signal $B_{N,j1}$.

2. The divider of claim 7 further including a quotient register having (N−1) binary stages, each of said stages of the quotient register being separately responsive to the $B_{N,j1}$ signals derived from the $C_{N-1,jl}$ cells.

3. The divider of claim 1 further including means for feeding borrow signals of predetermined value to cells $C_{O,j1}$, and means for feeding minuend signals of predetermined value to cells $C_{0,j2}$, where $j2$ runs the gamut of integers from 1 to N−2.

4. The divider of claim 1 wherein the difference network of cell $C_{i,j1}$ includes means for deriving its $D_{i+1,j1+1}$ output signal in accordance with:

$$D_{i+1,j1+1}=\overline{B}_{i,j1}\overline{S}_jM_{i,j1}+\overline{B}_{i,j1}S_j\overline{M}_{i,j1}+B_{i,j1}\overline{S}_j,\overline{M}_{i,j1}+B_{i,j1}S_jM_{i,j1}$$

5. The divider of claim 1 wherein the borrow network of cell $C_{i,j1}$ includes means for deriving its $B_{i+1,j1}$ output signal in accordance with:

$$B_{i+1,j1}=B_{i,j1}\,S_j+B_{i,j1}\,\overline{M}_{i,j1}+S_j\,\overline{M}_{i,j1}$$

6. The divider of claim 1 wherein the selection network of cell $C_{i,jl}$ includes means for deriving its $M_{i+1,j1+1}$ output signal in accordance with:

$$M_{i+1,j1+1}=\overline{B}_{N,j1}\,D_{i+1,j1+1}+B_{N,j1}\,\overline{M}_{i,j1}.$$

7. The divider of claim 1 further including a remainder register having 2(N−1) binary stages, the first (N−1) of the stages of the remainder register being separately responsive to the $M_{i1,N-1}$ minuend signals derived from cells $C_{i1,N-1}$, the remaining (N−1) of the stages of the remainder register being separately responsive to the $M_{N,j3}$ minuend signals derived from cells $C_{N-1,j4}$, where:

$i_1$ runs the gamut of integers from 1 to N−1;

$j_3$ runs the gamut of integers from 1 to N−1 and $j_4$ runs the gamut of integers from 0 to N−2.

* * * * *